United States Patent [19]

Hardouin

[11] 4,392,677

[45] Jul. 12, 1983

[54] CONNECTING DEVICE FOR PNEUMATIC APPARATUS

[75] Inventor: Pierre Hardouin, Nanterre, France

[73] Assignee: La Telemecanique Electrique, France

[21] Appl. No.: 211,963

[22] Filed: Dec. 1, 1980

[30] Foreign Application Priority Data

Nov. 30, 1979 [FR] France .................... 79 29821

[51] Int. Cl.³ .......................................... F16L 39/00
[52] U.S. Cl. ............................. 285/137 R; 137/271; 411/104
[58] Field of Search .................... 285/137 R; 137/271; 411/104, 537, 538, 349

[56] References Cited

U.S. PATENT DOCUMENTS

| 2,747,638 | 5/1956 | Cederquist | 411/104 |
| 2,825,379 | 3/1958 | Becker | 411/104 |
| 3,654,960 | 4/1972 | Kiernan | 137/271 X |
| 3,707,989 | 1/1973 | Jullien-Davin | 137/271 X |
| 4,051,861 | 10/1977 | Ellison et al. | 285/137 R X |

FOREIGN PATENT DOCUMENTS 694040  7/1953  United Kingdom ............... 411/104

*Primary Examiner*—Thomas F. Callaghan
*Attorney, Agent, or Firm*—William A. Drocker

[57] ABSTRACT

A connecting device is for pneumatic apparatus intended particularly to control the distribution of fliuds passing to receptor apparatus. The body (1) of each apparatus can be coupled to that of an identical or analogous apparatus, placed upstream or downstream, by orientatable screws (45) placed in housings opening in the region of faces (5,6) coming into contact during association (25,26). This device is applicable to all apparatus intended to constitute a group of identical apparatuses, and is applied advantageously to the construction of an assembly for the control of jacks.

5 Claims, 6 Drawing Figures

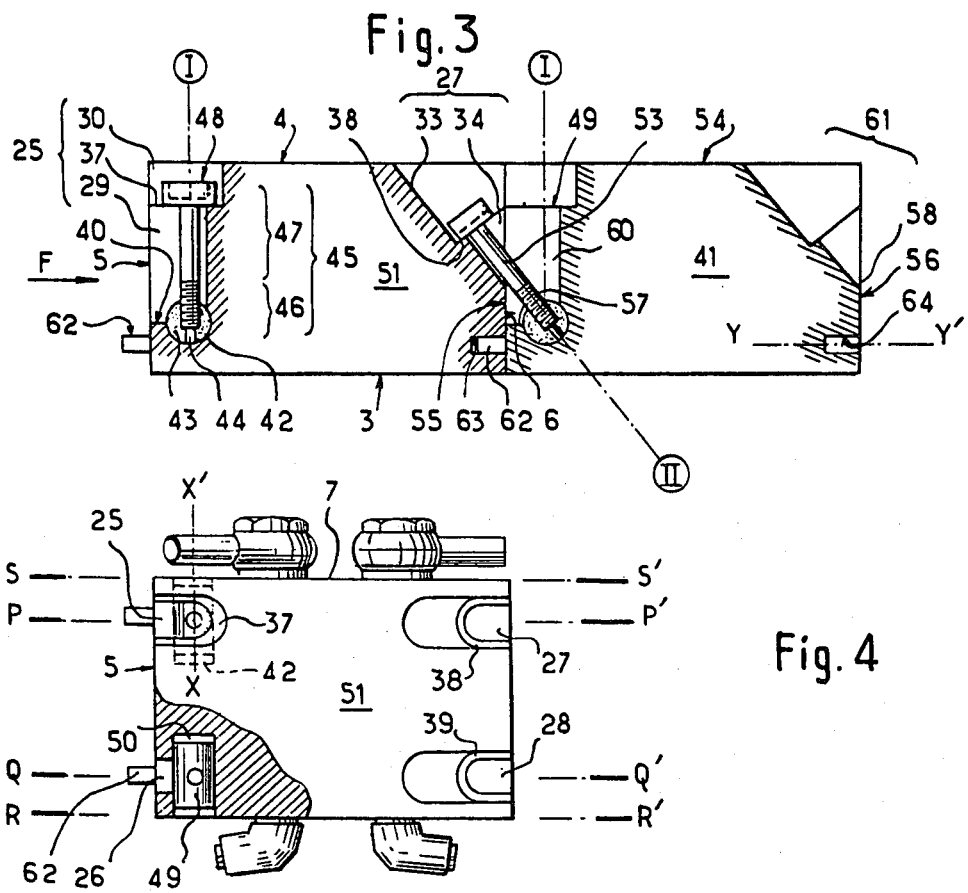
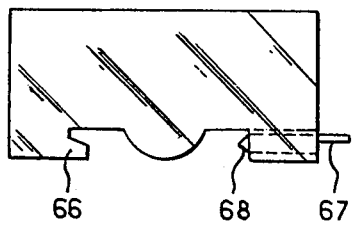
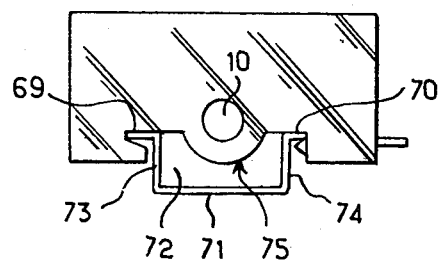

CONNECTING DEVICE FOR PNEUMATIC APPARATUS

BACKGROUND OF THE INVENTION

The invention relates to a connectable pneumatic apparatus comprising a body having:
a first face intended for its fixation on a support,
a second face parallel to and opposed to the first intended to receive a removable pneumatic fluid switching apparatus,
a third and a fourth face, parallel to each other and perpendicular to the first face, these third and fourth faces each respectively presenting a first and a second orifice for the passage of fluid under pressure, and respectively a first and a second orifice for passage of fluid to exhaust,
coupling means disposed in the vicinity of the said third and fourth faces to ensure the connection of two adjacent bases, these means comprising on the one hand some stop surfaces and on the other hand some headed screws each having a threaded portion and the axes of which are inclined with respect to the first face in such a manner that, when the heads bear on inclined bearing surfaces integral with a first base and the threaded portions are engaged in tapped holes in a second base adjacent to the first, the third and fourth faces respectively of the first base and of the second base are applied one against the other to form a fluid-tight coupling of the first, second, third and fourth orifices respectively belonging to these bases,
this base comprising finally orifices for distribution of fluid and orifices for the arrival of signals for control of a switching member.

Such bases are particularly utilised in systems for automation by pneumatic means where the property of association that they present permits the erection of rows of apparatus having a clear constitution for the builder, the user, and the repair worker.

PRIOR ART

The known bases corresponding to the form mentioned hereinabove have inconveniences which particularly arise from the fact that the coupling means are disposed externally on relatively narrow faces themselves carrying means for pneumatic connection, the access to which becomes very awkward for this reason, and to which it is difficult to impart a lateral orientation: furthermore, the tightening screws, which must be introduced or removed by a lateral movement, necessitate a large spacing between two rows of associated bases, and can become lost; finally, the presence of stop surfaces which are carried by extensions largely extending beyond the associated faces necessitate the carrying out of a large separation for either the disengagement of a base, or the separation of adjacent bases, to which it is necessary to resort for substituting or introducing a new pneumatic apparatus after the initial construction.

OBJECT OF THE INVENTION

The invention proposes to provide a simple and effective connecting device which is exempt from the inconveniences referred to hereinabove, and the use of which will provide a gain of space and a gain of time for construction.

SUMMARY OF THE INVENTION

According to the invention, this result is obtained by reason of the fact that the threaded holes which receive a threaded portion of the screw, are each carried by a member pivoting about an axis parallel to the first face and to the fourth face,
that a first housing of the body opening on this fourth face and on this second face contains a portion of said member having the threaded hole,
that the portion of the screw which is not engaged into the threaded hole becomes situated in this housing in a first position representing its rest position,
that a second housing of the body, opening on this third face and on this second face, has two portions of different widths coupled one to the other by a bearing surface which constitutes the said inclined portion, on which bears the head of the screw when the latter is placed in a second position which is inclined with respect to the first position and which represents its working position,
that the planes in which the screws pivot are comprised between the two planes respectively containing the fifth and sixth faces,
and that the said stop surfaces are comprised between the said planes.

BRIEF DESCRIPTION OF THE DRAWINGS

Further advantages and features of the invention will appear better from reading of the following description, which is accompanied by the drawings, wherein:

FIG. 3 shows in elevation a longitudinal section of two apparatuses taken on a plane passing through the coupling means;

FIG. 4 shows a view from above in partial transverse section on a plane passing through the pivoting axes of the coupling means;

FIGS. 5 and 6 show an apparatus in side view respectively when mounted on a conventional profile, and when de-mounted therefrom.

DESCRIPTION OF THE PREFERRED EMBODIMENT

Figure 1:
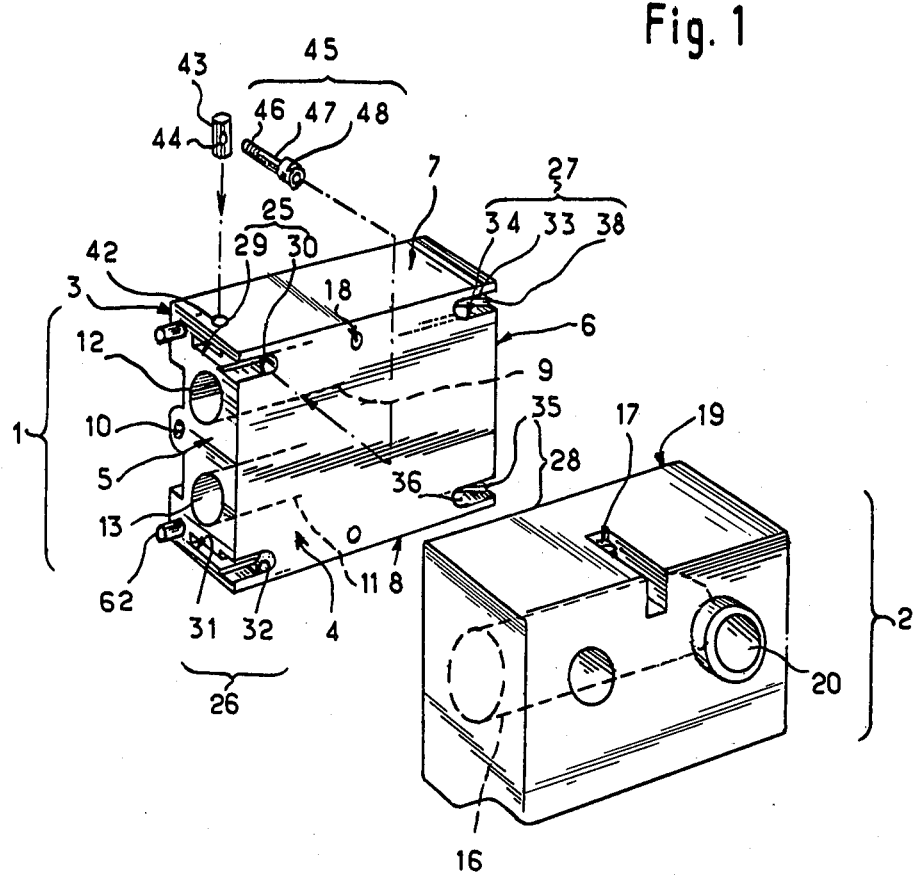
FIG. 1 shows an apparatus in accordance with the invention seen in perspective from a first side.
Figure 2:
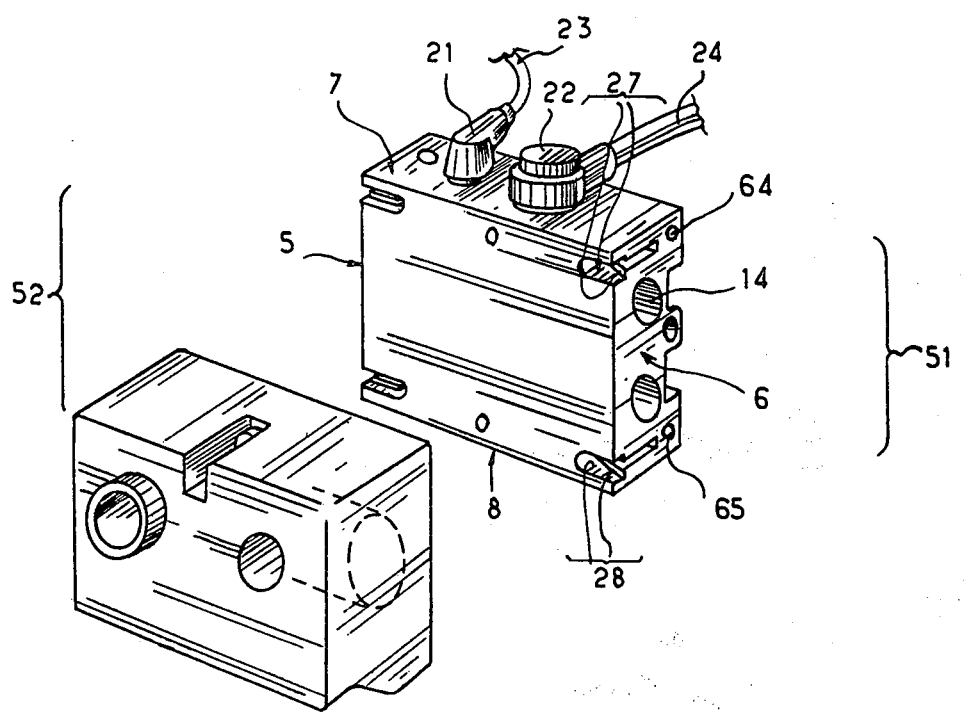
FIG. 2 illustrates in perspective an apparatus similar to that of FIG. 1, seen from a second side.

A pneumatic apparatus the body of which is constituted by way of non-limiting example by the assembly of two bodies 1 and 2 is shown in FIGS. 1 and 2, and is intended to be associated to other pneumatic apparatuses having an anologous or identical configuration.

In the example of construction illustrated, the half-body 1 is a base intended to be fixed by a first face 3 on a support not shown in this figure.

This base comprises a second face 4 parallel and opposed to the first, a third face 5 and a fourth face 6 parallel to each other, and perpendicular to the first face, as well as a fifth face 7 and a sixth face 8 which are opposed.

Channels such as 9, 10 and 11 pass partially or wholly through the base, and enter therein by first orifices such as 12 and 13 which open on the face 5 and for ensuring for example the circulation of a fluid under pressure, and the circulation of an exhausting fluid to second orifices 14, 15 opening at the face 6. If the half-body 1 of the base does not contain itself any member to ensure a break, a switching or an orientation of fluid, a distributor member 16 can be placed for this purpose in the half-body 2 which is secured in removable manner on the face 4 by means of screws such as are shown at 17, which engage into threaded holes such as 18, of the face 4.

In this case, orifices (not shown) open at the face 4 to communicate with orifices (not shown) placed opposite to the face 19 of the half-body 2 to provide couplings to the distribution member. Further, this half-body 2 can comprise an external control member such as 20 intended to cause a change of state of the distributor member.

As shown in FIG. 2, where there is shown an apparatus analogous to or identical with the preceding one formed by half-bodies 51, 52, the face 7 comprises connectors 21 and 22 which are most often orientatable, which couple the base by flexible tubes such as 23, 24, either to generators of pneumatic control signals adapted to cause a change of state of the distributing member, or coupling the base respectively to utilising apparatuses such as jacks.

The face 8 can likewise comprise such connectors, and in this case, the choice would be made to preferably place the connectors having analogous functions on a same face. In all cases, the putting to use of the properties of orientation of these connectors and the access for the tightening tools used for fixing them, necessitate that the faces 7, 8 shall be as free as possible of any protruberance.

The connection of the apparatuses between themselves is achieved when the third face of a particular base is applied against the fourth fae of a base placed upstream, or that the fourth face of this particular base is applied against the third face of a base place downstream, and that in all cases, the orifices carried by these opposed and associated faces are placed opposite one another in a fluid-tight manner.

For this purpose of association, tightening means are disposed in the region of the faces, as can generally be seen in FIGS. 1 and 2, and in particular in FIG. 3.

It will be seen in FIG. 1 that two housings 25, 26 open at the third face and at the second face, and that two housings 27, 28; open on the fourth and on the second face.

These housings are centered about two planes PP' and QQ' which are parallel to each other, perpendicular to the first face and are in their turn placed between the parallel planes RR' and SS' passing through the fifth face 7 and sixth face 8 respectively, as can be seen in FIG. 4.

The housings 25, 26 and 27, 28 each comprise two successive portions 29, 30 and 31, 32 respectively and 33, 34 and 35, 36 respectively with substantially parallel walls, these two portions being of different widths $d_1$ and $d_2$, and being coupled one to the other by transverse bearing surfaces such as those shown respectively at 37, 38, 39 in FIG. 4, these surfaces visible also in FIGS. 1 and 2 not having any reference numerals but being darkened for clarity of the drawing.

In the vicinity of a base 40 of a housing such as 25 visible in FIG. 1 and adjacent to the first face 3 there is formed a cylindrical opening 42 the axis XX' of which is perpendicular to the plane P, and which opens at the fifth face 7; this cylindrical opening likewise opens in this housing 25 in such a manner that a cylindrical pivot 43, placed in this opening and comprising a zone provided with a radial threaded hole 44, presents this latter in the said housing.

A screw 45 comprising a threaded portion 46, a shank 47 and a head 48 is engaged in the threaded hole and can pivot in this housing about the axis XX', whilst preventing axial movements of the member 43.

This screw can in particular assume, in the housing 25 of a base 51, a first position I called the rest position, in which its head will bear, by screwing up of the screw, on the bearing surface 37, by reason of the fact that the portions 29 and 39 of the housing are respectively less than and greater than the diameter of the head.

The housing 26 has an identical configuration, whilst the housings 27, 28 terminating at the fourth face 6 each have a comparable appearance to that which has been described, that is to say with the presence of the two successive portions 33, 34 of different widths which are joined one to the other by a respective bearing surface 38 and 39. For these latter housings, the bearing surfaces are nevertheless inclined with respect to the first face, as can be seen in particular in FIG. 3.

The third and fourth faces 55, 56 of a second base 41 analogous to the base 51 comprises, in the region of the bottoms 57, 58 of the first and second housings such as 60 and 61 respectively, stop surfaces carried by two studs 62, 53 protruding slightly from these faces, and respectively by two cylindrical openings 64, 65 of the same diameter as the studs. A stud and an opening placed in the vicinity of the two opposed housings situated in a same plane are concentric with a same axis YY', which passes between the face 3 and each housing bottom 57, 58.

When two bases 51 and 41 are associated by their third and fourth faces, as shown in FIG. 3, a housing 27 of the base 51 placed upstream comes opposite to a housing 60 of the base 41 placed downstream when a stud 62 of the latter enters the cylindrical opening 63 of 51.

If the screw 53 of the base 41, assumed at the start to be in its rest position I, is slightly unscrewed, it is possible to make it leave its bearing surface 49 and to make it pivot in the direction opposite to the hands of a clock until the momment when its head comes, for the working position II, opposite to the bearing surfaces 38 of the base 59. Tightening again of the screw then brings this head to bear on the bearing surface 39 and only communicates to the adjacent base 51 a movement towards the base 41 in the direction of the arrow F, by reason of the cooperation between the stop surfaces carried by the studs such as 62 and the cylindrical holes such as 63.

The association of several bases with the means and in the manner described hereinabove, has the advantage of not requiring any member passing beyond the faces 7, 8, and obtains a very effective tightening; further, the coupling screw which is retained in its housing in rest position, cannot get lost, whilst the access for a tool to the head for tightening is much facilitated by reason of the terminating of these housings either on the second face 54 of the base 41 or on the second face 57 of the base 51.

In order to ensure the fixing of the bases on a support, there is disposed on the face 2 a means for rapid engagement on a conventional profile.

These means comprise, as is shown in FIG. 5, a longitudinal rib 66 of the base and a resilient screw 67 movable in the vicinity of the face 3 which has a ramp 68 to bring about its reverse movement at the moment of engagement on wings 69,70 placed in a same plane of a profile 71, known as a "hat," as can be seen in FIG. 6.

This feature permits rapid placing of a series of bases on a same profile, to then bring them easily into contact one with the other, and finally to achieve in simple manner the placing in working position and the tightening of the screws to assure a positive connection.

A possible modification of this connection can be achieved readily by sliding along the profile a portion of a group of bases already connected, whilst the provision of flexible conduits is particularly facilitated by the lateral disposition of the connectors and the total absence of obstacles to their rotation.

The use of a "hat" profile again provides the advantage of leaving free a large longitudinal space 72 placed between the parallel arms 73, 74 of this profile carrying wings at their ends; in an advantageous manner of construction of the invention, this space is occupied by a longitudinal rib 75 of the base placed between the flange and the screw, an auxiliary channel 10 being situated in this rib.

I claim:

1. In a connecting device for pneumatic bases each having two opposed parallel coupling faces provided with orifices to be associated, and a support face perpendicular to the former and adapted to receive a removable pneumatic switching component, two opposed coupling faces of two adjacent bases being applied one against the other by means of screws the axes of which are inclined with respect to these faces, and which each have a threaded end cooperating with a nut situated in a housing of one of the bases, a head opposite to this end bearing on a shoulder of an adjacent base, and an intermediate portion placed in two channel portions one in extension of the other, these portions being situated respectively between the common plane of two coupling faces at which they open, and respectively the nut and the shoulder, the improvement which comprises the nut is constituted by an element which pivots about an axis parallel to said coupling faces and which is placed in a base of a first portion of channel opening at the support face, the length of the screw being such that its head is disposed below said support face when its axis is perpendicular to the latter, and said head is pressed on a shoulder disposed in a second portion of channel opening at the support face of an adjacent base and in the vicinity of said support face, when the axis of the screw is inclined, two screws being respectively placed in two parallel planes between which open the orifices to be connected.

2. A connecting device, according to claim 1, wherein the first channel portion comprises a shoulder adapted to cooperate with the head of the screw.

3. A connecting device, according to claim 1, wherein an exit face and an entry face, both parallel to said parallel planes, and perpendicular to said support face, receive respectively first coupling elements for the feeding of jacks, and second coupling elements for the feeding of jacks, and second coupling elements for the transmission of control signals to a pneumatic switching component.

4. A connecting device, according to claim 1, wherein the respective channel portions opening at the support face are covered by the pneumatic component when the latter is associated with the base.

5. A connecting device, according to claim 1, wherein a fixing face opposite to the support face is provided with means adapted to cooperate with a profiled fixing rail.

* * * * *